United States Patent [19]

Friedman

[11] 4,352,396

[45] Oct. 5, 1982

[54] METHOD FOR SELECTIVE PLUGGING USING RESIN EMULSIONS

[75] Inventor: Robert H. Friedman, Houston, Tex.

[73] Assignee: Getty Oil Company, Houston, Tex.

[21] Appl. No.: 208,657

[22] Filed: Nov. 20, 1980

[51] Int. Cl.$^3$ ............................................. E21B 33/138
[52] U.S. Cl. .................................... 166/295; 166/300
[58] Field of Search ....................... 166/270, 295, 300

[56] References Cited

U.S. PATENT DOCUMENTS

| | | | |
|---|---|---|---|
| 2,604,947 | 7/1952 | Martin | 166/295 X |
| 2,858,892 | 11/1958 | Carpenter | 166/295 |
| 3,123,158 | 3/1964 | Gallus | 166/295 X |
| 3,724,551 | 4/1973 | Troscinski et al. | 166/295 |
| 3,759,327 | 9/1973 | Carnes | 166/295 |
| 3,866,684 | 2/1975 | Friedman | 166/300 X |
| 3,866,685 | 2/1975 | Friedman | 166/300 X |
| 3,892,275 | 7/1975 | Lybarger et al. | 166/300 X |

FOREIGN PATENT DOCUMENTS 1195812  6/1970  United Kingdom ................ 166/270

OTHER PUBLICATIONS

Morrison et al., *Organic Chemistry*, Second Edition, Allyn and Bacon, Inc., 1966, pp. 678–681.

*Primary Examiner*—Stephen J. Novosad
*Assistant Examiner*—George A. Suchfield
*Attorney, Agent, or Firm*—Arnold, White & Durkee

[57] ABSTRACT

Methods and compositions are provided for selectively plugging the water-rich strata of subterranean formations, including injection into the formation of a water-insoluble, oil-soluble resin emulsion. A series of chemical reactions is initiated in-situ such that the emulsion demulsifies, resulting in the coalescence of resin droplets. The coalesced water-insoluble, oil-soluble resin droplets are effective to selectively plug the water-rich strata over a relatively long distance and over a relatively long period of time.

10 Claims, No Drawings

METHOD FOR SELECTIVE PLUGGING USING RESIN EMULSIONS

BACKGROUND OF THE INVENTION

This invention relates to methods for selectively plugging water-rich strata of subterranean formations. More particularly, the invention relates to a process of demulsifying in-situ an emulsified resin to accomplish selective plugging of water-rich strata.

In the drilling and production of fluid mineral deposits such as petroleum oil and gas from subterranean formations, presence of water has been a continuing problem. In almost every subterranean formation wherein either petroleum oil or gas (hereinafter "oil") is present in quantities which make production practical, water is also present (usually aqueous brine solutions). Usually, certain portions of strata of an oil-bearing formation may be considered oil-rich, and other portions of strata of the formation will be considered water-rich.

Production of connate water along with oil from the producing formation is not desired for many reasons, among them being the extra production expenses encountered, the necessity for separation of the oil and water following the production, and the fact that means must be provided for getting rid of undesired brackish water which is a pollutant to the surrounding terrain.

In addition, these disadvantages are magnified when certain post-primary recovery processes such as waterflood operations are utilized in such formations. In accordance with these processes, it is customary to inject a driving fluid through one or more injection wells, and to produce oil through one or more producing wells. The well fluids are pushed by the driving fluids through the formation from the area of the injection wells to the area of the producing wells. By the very nature of such processes, a relatively large amount of injected fluids will be produced at the producing well or wells. It is thus imperative that enough oil be produced through the producing wells along with the water (connate and injected) to make the process economical.

Another factor existing in many subterranean formations that seriously complicates the undesired presence of water is the existence, within the formation, of gross differences in permeability. Oil-bearing formations cannot be considered as having a homogeneous nature. It is well-known that permeability profiles of pay sand show irregularities both horizontally and vertically. For example, oil-bearing strata may be separated by shale streaks which prevent vertical migration between them and provide independent paths between injection wells and producing wells. These independent paths will likely have different effective permeabilities and generally speaking water-rich portions of strata will be the more porous strata.

These and other factors result in the watering-out of certain portions of an oil-bearing formation prior to the watering-out of other portions during water flooding. When this occurs, water passing through a watered-out strata results in oil production at increasingly unfavorable water-to-oil ratios. This water by-passing often becomes a controlling factor in determining the final recovery which may be obtained economically by waterflooding operations. This is particularly true when the oil sand is highly heterogeneous.

The shape of the reservoir which is swept by an advancing front of injected fluid may be such that large quantities of theoretically recoverable oil will not be affected by fluid flood. Thus, such oil might not be recovered because the flooding medium is preferentially channeled into other parts of the formation. Studies of reservoirs after waterflooding have indicated that two-thirds of the residual oil is frequently located in portions of the reservoir which waterflooding has not reached, while in the water-swept portions oil content may be near the irreducible minimum.

The economic significance of recovery operations of this type is great and the problem as described above has been well-recognized by the oil and gas industry for many years. Many efforts have been made to solve the problem in whole or in part.

One approach suggested in the art is to selectively plug the more porous water-rich strata so that water from such strata will not be selective produced or selectively swept by the driving fluid used in the post-primary process, or at least so that the oil-to-water ratio will be improved. The present invention is directed to this method, which is often called "selective plugging".

Various solutions have been proposed by the prior art for selectively plugging porous water-rich strata. Discussions of some of these prior art methods are found in Applicant's earlier patents, U.S. Pat. Nos. 3,749,147; 3,811,508; 3,865,189; 3,866,684; 3,866,685; and 3,876,438.

Although some of the prior art solutions have been successful under certain conditions, the need remains for other practical and inexpensive solutions to these long-felt problems. Especially the need remains for a selective plugging composition and method which will gradually plug and is effective over a large area or distance. Many of the selective plugging methods and compositions of the prior art have suffered from the defect that even though they may have plugged the water-rich portions of the well, the plugging effect was evidenced over a small area. When that happened, the driving fluid in a post-primary process was allowed to by-pass the plugged portion and then re-enter the porous water-rich strata, thus presenting the same problems as outlined above.

Because of the expense of most potential injection fluids when compared to the oil which may be recovered, many such fluids are not practical or economical for use even though they may technically be efficient. Consequently, the need especially exists for a selective plugging composition and method of the type described above which additionally is sufficiently inexpensive to justify its use.

A major criteria, therefore, in formulating a selective plugging composition is that either a small quantity of material will be effective to accomplish the plugging, or that the material utilized be very inexpensive.

The present invention satisfies the above-mentioned problems by utilization of the Jamin Effect. In 1860, the French physicist, J. Jamin, experimenting with capillary tubes containing drops of liquid interspersed with gas, found that very large pressures across the tubes were frequently necessary to cause any fluid motion. It was subsequently found that the two fluids in the tube could both be liquids providing only that the interfacial tension between them was high. The phenomenon is observable if there is only a single droplet of liquid B in the capillary otherwise filled with liquid A providing that the droplet is as large in diameter as the capillary. Given high interfacial tension, the interfacial area between A and B will be the minimum possible. Any attempt to dislodge the droplet will cause a distortion which will necessarily cause an increase in interfacial area. To achieve this increase requires that work be done on the system. This work requirement is what gives rise to the increased pressure demand.

It has been calculated (J. J. Taber, New Mexico Petroleum Recovery Research Center), that a separated droplet of oil in a reservoir can require a pressure gradient of 2 psi/foot for every dyne/centimeter of interfacial tension between the oil and the formation water in order for fluid motion to be initiated.

SUMMARY OF THE INVENTION

The present invention relates to selective plugging methods and compositions, wherein an inexpensive resin emulsion is injected into a subterranean formation. A series of chemical reactions is initiated in-situ such that the emulsion demulsifies wherein the water-insoluble, oil-soluble resin coalesces. The resulting coalescence product is effective in selectively plugging the water-rich portions of the formation over a relatively large area and over a relatively long period of time.

The principle of this inventive entity is the concept that a droplet which is sufficiently small to enter the formation must therefore have a diameter smaller than the pore. However, in order to exhibit the Jamin Effect, the droplet must be as large in diameter as the pore. The only way that this can happen is that the small droplets must coalesce into larger ones. It is, therefore, a feature of this invention that a resin having a small diameter in the form of an emulsion is injected into a formation. Once in the formation there are a series of chemical reactions which results in the demulsification of the emulsion, thereby allowing the droplets to coalesce and form larger diametered droplets.

In one embodiment of the invention, a water-insoluble, oil-soluble resin is incorporated into an emulsion composition by interspersing very small precipitated droplets of the resin into a water base. This emulsion further comprises an acid-sensitive emulsifying agent and an ester of an organic acid. This emulsion composition is injected into the formation wherein the temperature of the formation is sufficient to hydrolyze the ester into its corresponding carboxylic acid. This acid then is effective in demulsifying the emulsion, wherein the resin droplets coalesce to effectively plug the water-rich strata.

In another embodiment similar to the first, a weak acid is further incorporated into the emulsion composition. At ambient surface temperatures this weak acid does not have sufficient acid strength to initiate demulsification. However, once the emulsion is injected into the formation, the concommittant contribution of the relatively high temperature in the formation and the weak acid is effective in hydrolyzing the ester to form a second acid stronger than the first acid. The second acid is preselected to be sufficiently strong to induce demulsification and subsequent resin coalescence.

DETAILED DESCRIPTION OF PREFERRED EMBODIMENTS

This invention relates to selective plugging compositions and methods, which are effective to selectively plugging a relatively large distance or area of a porous water-rich strata or portion of a formation, the plugging occurring over a relatively long time span.

The compositions provided are emulsions comprising an aqueous continuous phase and a water-insoluble, oil-soluble resinous disperse phase held in suspension by an emulsifier. Also included in the composition is an ester compound which reacts in-situ to promote demulsification, thereby allowing the water-insoluble resin droplets to coalesce. It is this coalescence produce which ultimately blocks the pores of the water-rich strata.

The invention will be described in terms of the preferred embodiments, which represent the best mode of the invention as known to the inventor at the time of this application.

In accordance with a first embodiment of the invention, an emulsion is provided comprising an aqueous continuous phase and a water-insoluble, oil-soluble resinous disperse phase held in suspension by an acid-sensitive emulsifier which is desirably a salt of an organic acid. Also included in the composition is a triggering ester. As the composition is injected into the subterranean formation, the relatively high temperature of the formation drives a hydrolysis reaction of the triggering ester to form its corresponding carboxylic acid and alcohol constituents. The formed acid then effects demulsification by salting out or precipitating the emulsifier. The resin, which has a softening point temperature lower than the temperature of the formation, forms liquid droplets when demulsified. These liquid droplets then coalesce forming larger droplets which are effective in plugging the pores of the water-rich strata.

Selection of the particular resin emulsion for any given situation will depend on a number of factors such as availability, cost, and the nature of the subterranean formation. For example, the temperature of the formation dictates that the chosen resin have a softening point temperature lower than the temperature of the formation. There are certain readily available and inexpensive resin emulsions with a range of softening points from about 80°–200° F. In addition, oil-soluble resins from which emulsions can be made are available with softening points up to at least 350° C.

An example of a commercially available resin emulsion is Picconol A-102 marketed by Hercules, Incorporated of Wilmington, Delaware. This resin emulsion comprises a 50% emulsion of petroleum aliphatic particles stabilized with a soap of wood rosin as the emulsifier. The resin has a softening point of about 200° F. Another resin which is useful in lower temperature field is Picconol 152.

The selection of the included ester is based on the same factors as above and in addition, there is the consideration that the hydrolyzed acid product must have sufficient acid strength to initiate demulsification. An example of a preferred ester is ethyl monochloroacetate.

In accordance with another embodiment of the invention, the emulsion composition further comprises an acid, which is a weaker acid than the corresponding carboxylic acid of the hydrolyzed ester. This weaker acid is added to effect a reaction in-situ forcing hydrolysis of the ester by shifting the equilibrium in favor of strong acid production. Under certain conditions this becomes a more efficient and complete reaction than the hydrolysis mechanism presented in the first embodiment. A preferred example of a weak acid is acetic acid.

In accordance with the above embodiment of the invention, a non-ionic surfactant may be added to the emulsion composition to provide stabilization of the emulsion endangered by the incorporation of the weaker acid. Preferably, this surfactant is not stable at the elevated temperature of the subterranean formation.

To further illustrate the invention, Applicant has performed several laboratory experiments which have yielded good results on permeability reduction. The examples which follow, which should not be considered as limiting the invention but rather only as exemplary of various embodiments, are based on those laboratory results.

In these experiments, nylon pressure tubing (internal diameter=0.295 inch) was cut into three-foot lengths and equipped with fittings and screens. These segments were packed with #4 flintshot to a permeability of 35-45 darcies and a pore volume of about 4.5 ml/foot of length. Segments were assembled in units of seven to make a column of about 21 feet. The column was coiled and placed in an oven at 100° C. Several inches of the column at either end, extended into the room. This guaranteed that during injection there would be a non-zero temperature gradient, positive in the direction of flow.

EXAMPLE I

An emulsion mixture was prepared containing Picconol A-102, a commercially available resin emulsion from Hercules, Incorporated, wherein the resin solid comprise about 10% (weight/volume) of the final emulsion mixture; ethyl monochloroacetate, about 0.15 M in final mixture; acetic acid, about $3 \times 10^{-4}$ M in final mixture; polyethylene glycol (PEG) 400 Emerest 2650, about 2% (weight/weight) of the resin solids; and fresh water. This emulsion mixture was injected into the column at a constant pressure of 15 psi. After a total of 37 ml (0.41 pore volume) was injected plugging occurred. Permeability testing was then assessed with water. Inlet pressure was increased in 5 psi increments. No flow occurred at 25 psi or lower. At 30 psi flow began and a permeability of 7.42 darcies was determined, an 82% reduction in permeability from the original 42.3 darcies.

EXAMPLE II

The emulsion mixture was identical to that in Example I, except that the resin solids concentration was 1%. The 21'9" column had an original permeability of 26.23 darcies and pore volume of 90.2 ml. The column was injected with about 200 ml of emulsion at pressures from about 12 psi to 25 psi before plugging occurred. Testing was made on the column up to 60 psi without a break occurring.

This experiment confirmed that Jamin Effect blockage occurred as in the first example. Interestingly, Example II also showed that with dilute resin emulsions, coalescence occurs as a result of the flowing resin coalescing upon previously demulsified resin. Furthermore, less total resin was used in the second example than in the first to achieve comparable results.

As can be readily appreciated by the above description, this process is selective to reduce the permeability of the water-rich strata. Since the resin injected is water-insoluble and oil-soluble, precipitation and subsequent coalescence of the resin is selective for the water-rich phase. On the other hand, as the emulsion composition is injected into oil-rich strata, there is no associated plugging of the oil-rich strata because as the emulsion demulsifies the resin is freely soluble in the oil phase. The Jamin Effect requires that the interfacial tension between two liquids be relatively high before capillary plugging occurs. Since the resin is oil-soluble no appreciable interfacial tension will exist in the oil phase thereby precluding blockage of oil-rich strata pores.

Although the invention has been described in terms of particular embodiments which Applicant believes to represent the best modes of the invention at the time of this application, it will be recognized by those skilled in the art that various changes may be made in the composition and method embodiments of this specification without departing from the scope of the invention as defined in the following claims.

What is claimed is:

1. A method for selectively plugging water-rich strata of a relatively high-temperature subterranean formation containing strata which are water-rich and other strata which are oil-rich, and said strata having at least one borehole therein, comprising:

providing an aqueous resin emulsion comprising a water-insoluble, oil-soluble resin, an acid-sensitive emulsifier, and a water-soluble ester, passing said emulsion into said borehole;

injecting said emulsion into said formation at a pressure sufficient to overcome the natural formation pressure;

hydrolyzing said ester in-situ in said formation to form its corresponding alcohol and carboxylic acid constituents;

demulsifying the resin emulsion in-situ by reacting said carboxylic acid with the acid-sensitive emulsifier to effect subsequent coalescence of the resin, said coalescence product being effective to greatly reduce permeability of said water-rich strata over a relatively long distance and over a relatively long period of time.

2. A method for selectively plugging water-rich strata of a relatively high-temperature subterranean formation containing strata which are water-rich and other strata which are oil-rich, and said strata having at least one borehole therein, comprising:

providing an aqueous resin emulsion comprising a water-insoluble, oil-soluble resin, an acid-sensitive emulsifier, a water-soluble first acid, and a water-soluble ester of a second acid, said second acid being a stronger acid than said first acid;

passing said emulsion into said borehole;

injecting said emulsion into said formation at a pressure sufficient to overcome the natural formation pressure;

hydrolyzing the said ester by reacting it with the first acid in-situ in said high temperature formation to form its corresponding second acid;

demulsifying the resin emulsion in-situ by reacting the second acid with the acid-sensitive emulsifier to effect subsequent coalescence of the resin, said coalescence product being effective to greatly reduce permeability of said water-rich strata, over a relatively long distance and over a relatively long period of time.

3. The method in accordance with claims 1 or 2 wherein the emulsifier is a salt of an organic acid.

4. The method in accordance with claims 1 or 2 wherein the emulsifier is a rosin soap.

5. The method in accordance with claims 1 or 2 wherein the water-insoluble, oil-soluble resin has a softening point temperature lower than the temperature of the subterranean formation.

6. The method in accordance with claims 1 or 2 wherein the water-soluble ester is ethyl monochloroacetate.

7. The method in accordance with claims 1 or 2 wherein the resin component comprises from about 1% to about 10% of the emulsion.

8. The method in accordance with claims 1 or 2 wherein the water-insoluble, oil-soluble resin is an aliphatic hydrocarbon.

9. The method in accordance with claim 2 wherein the resin emulsion further comprises a surfactant to prevent the instability of emulsion associated with the inclusion of the water-soluble acid.

10. The method in accordance with claim 2 wherein the water-soluble first acid is acetic acid.

* * * * *